US008130710B2

(12) United States Patent
Lim et al.

(10) Patent No.: US 8,130,710 B2
(45) Date of Patent: Mar. 6, 2012

(54) METHOD OF ALLOCATING TERMINAL TO GROUP IN BASE STATION OF COMMUNICATION SYSTEM AND METHOD OF GENERATING MAP

(75) Inventors: Kwang-Jae Lim, Daejeon (KR); Chul-Sik Yoon, Seoul (KR)

(73) Assignees: Electronics and Telecommunications Research Institute, Daejeon (KR); Samsung Electronics Co., Ltd, Suwon-si (KR)

( * ) Notice: Subject to any disclaimer, the term of this patent is extended or adjusted under 35 U.S.C. 154(b) by 599 days.

(21) Appl. No.: 12/307,898

(22) PCT Filed: Jun. 28, 2007

(86) PCT No.: PCT/KR2007/003160
§ 371 (c)(1),
(2), (4) Date: Jan. 7, 2009

(87) PCT Pub. No.: WO2008/004785
PCT Pub. Date: Jan. 10, 2008

(65) Prior Publication Data
US 2009/0290546 A1 Nov. 26, 2009

(30) Foreign Application Priority Data

Jul. 7, 2006 (KR) .................. 10-2006-0063837
Feb. 2, 2007 (KR) .................. 10-2007-0011014

(51) Int. Cl.
*H04W 4/00* (2009.01)
(52) U.S. Cl. ....................................................... 370/329
(58) Field of Classification Search .................. 370/329
See application file for complete search history.

(56) References Cited

U.S. PATENT DOCUMENTS

| 6,498,936 | B1 * | 12/2002 | Raith ............................ 455/466 |
| 6,804,528 | B1 | 10/2004 | Laroia et al. |
| 6,996,104 | B2 | 2/2006 | Trossen et al. |
| 7,054,643 | B2 | 5/2006 | Trossen et al. |
| 2003/0125038 | A1 | 7/2003 | Western |
| 2005/0272432 | A1 | 12/2005 | Ji et al. |
| 2006/0083183 | A1 * | 4/2006 | Teague et al. ................. 370/278 |
| 2007/0201503 | A1 * | 8/2007 | Nishio ......................... 370/437 |
| 2007/0253421 | A1 * | 11/2007 | Cai .............................. 370/394 |
| 2007/0286066 | A1 * | 12/2007 | Zhang et al. .................. 370/208 |

FOREIGN PATENT DOCUMENTS
WO 01/45445 A1 6/2001

* cited by examiner

*Primary Examiner* — Jeffrey Pwu
*Assistant Examiner* — Saad A Waqas
(74) *Attorney, Agent, or Firm* — Jefferson IP Law, LLP

(57) ABSTRACT

In order to allocate a plurality of terminals to a group in a base station of a communication system, channel state information of each of the terminals is received, a group to which the terminal belongs is determined according to the channel state information with respect to the terminal, and a map including information on group burst allocation and information on sub-burst allocation with respect to a group identifier corresponding to the group is transmitted to the terminal.

14 Claims, 12 Drawing Sheets

[Fig. 1]
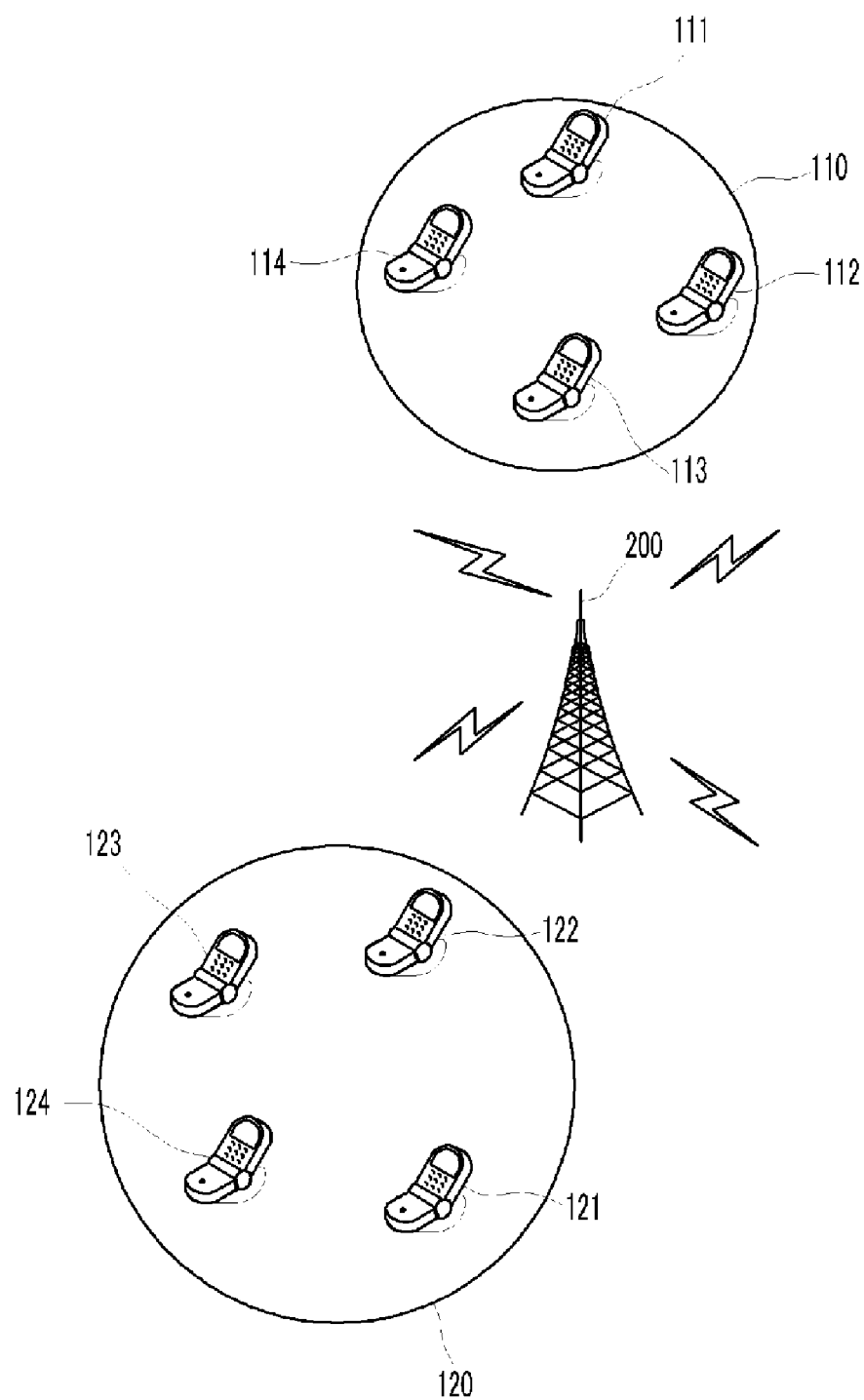

[Fig. 2]
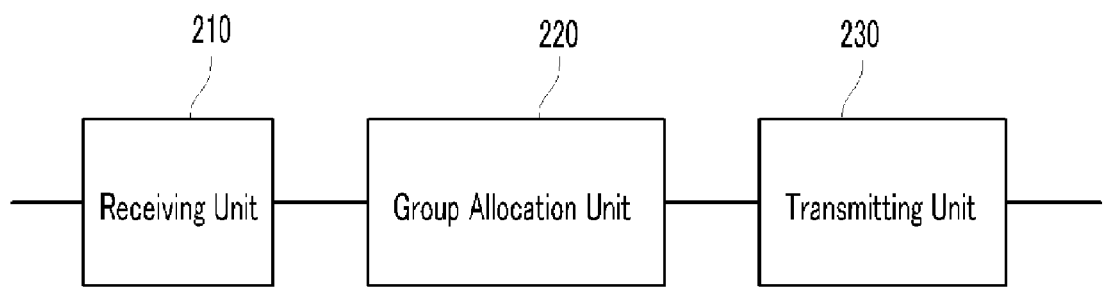

[Fig. 3]
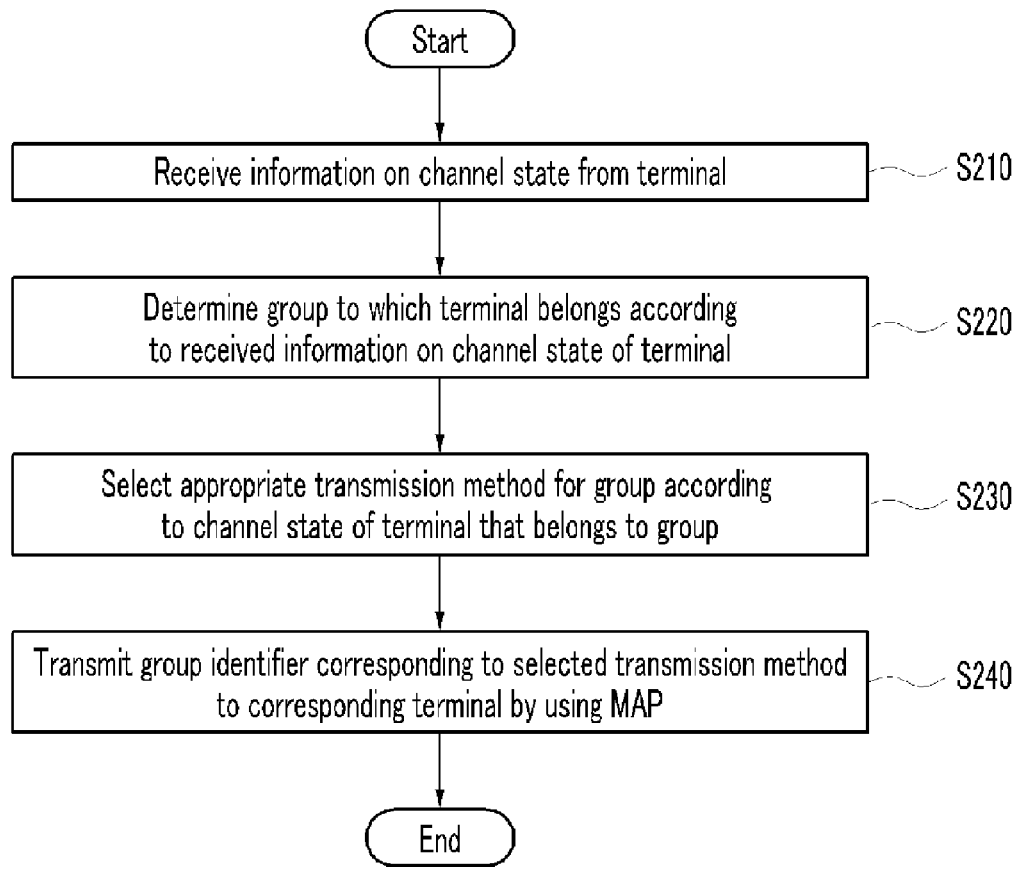

[Fig. 4]
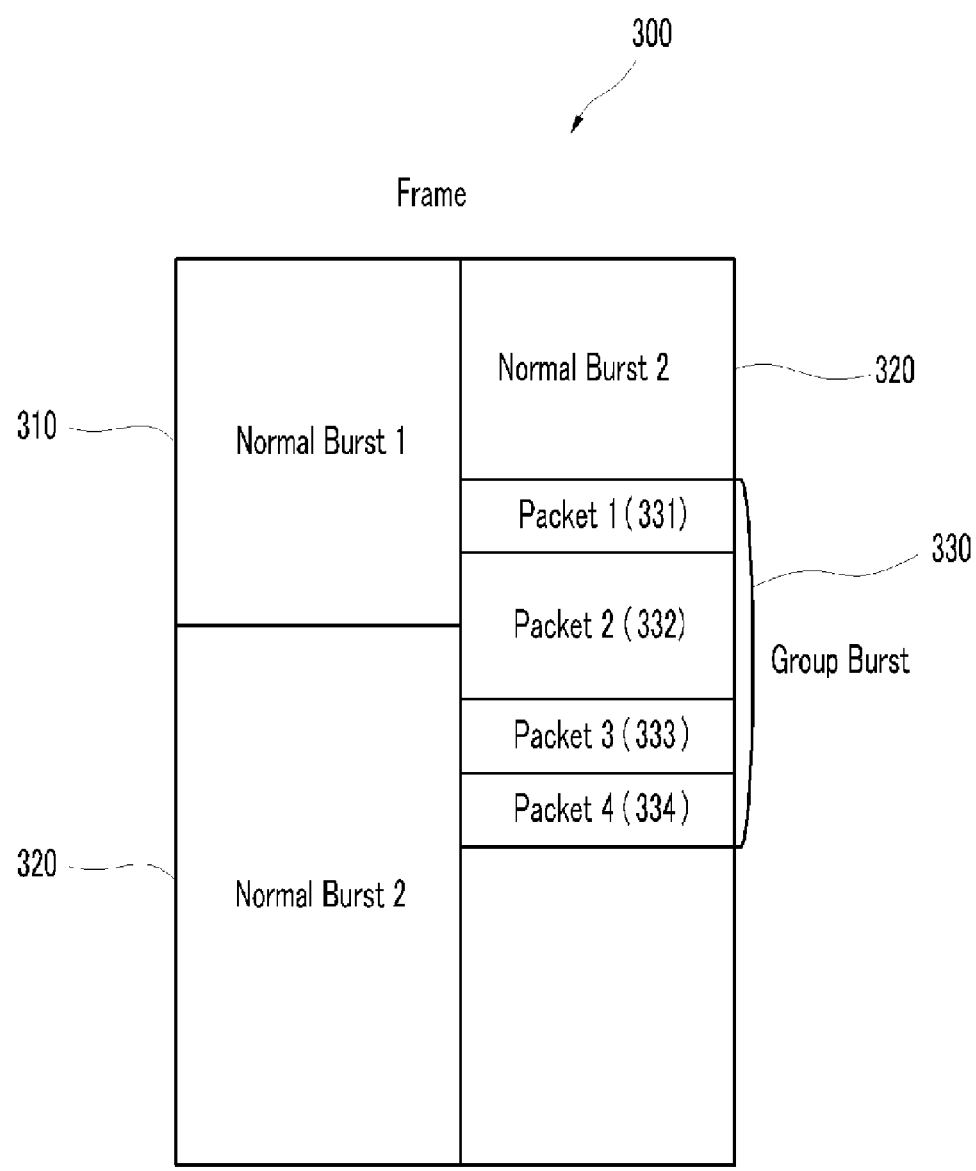

[Fig. 5]
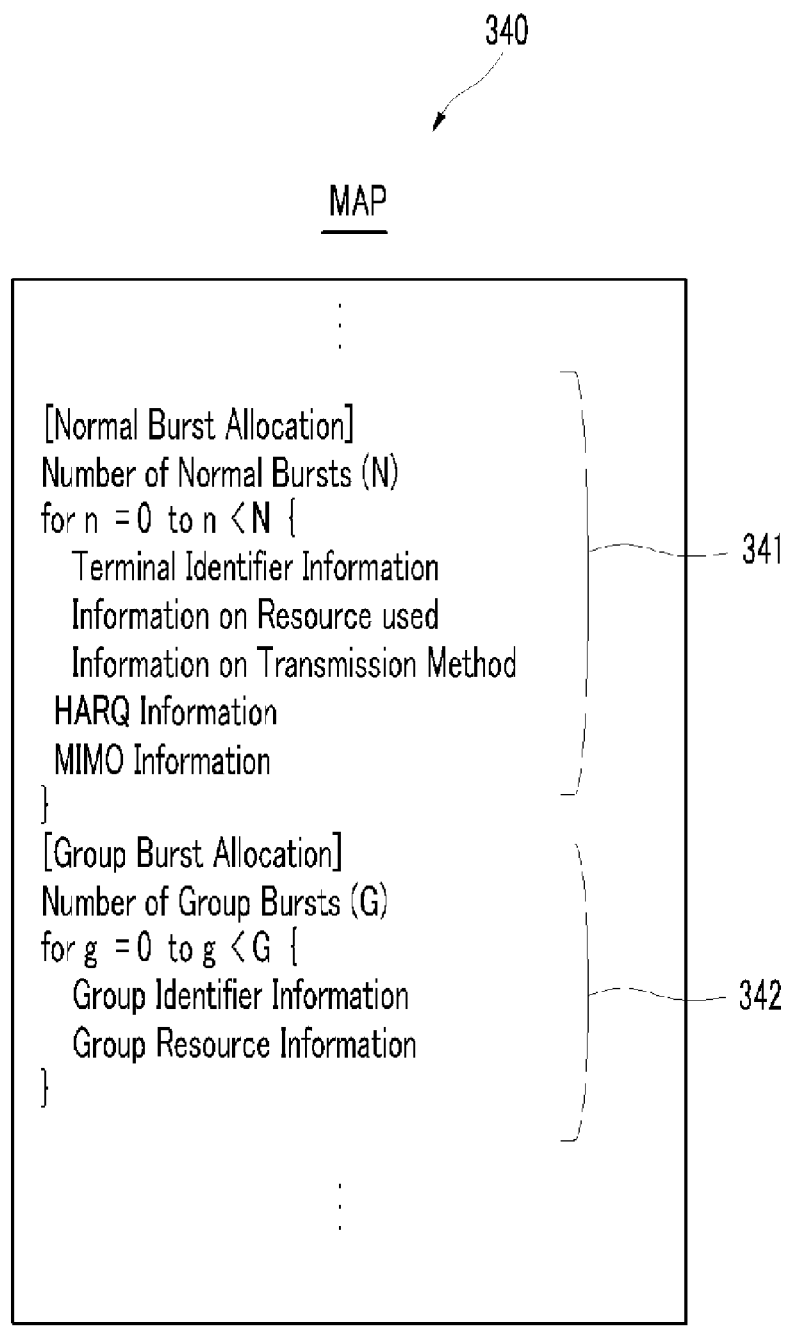

[Fig. 6]
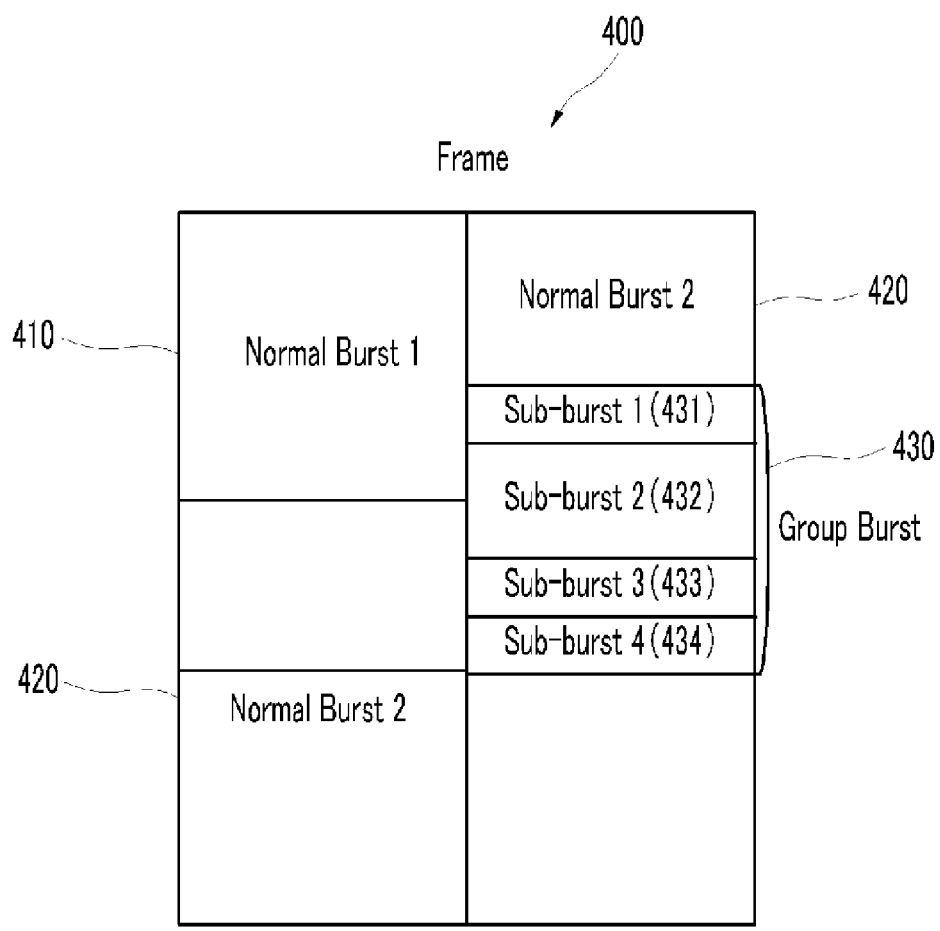

[Fig. 7]
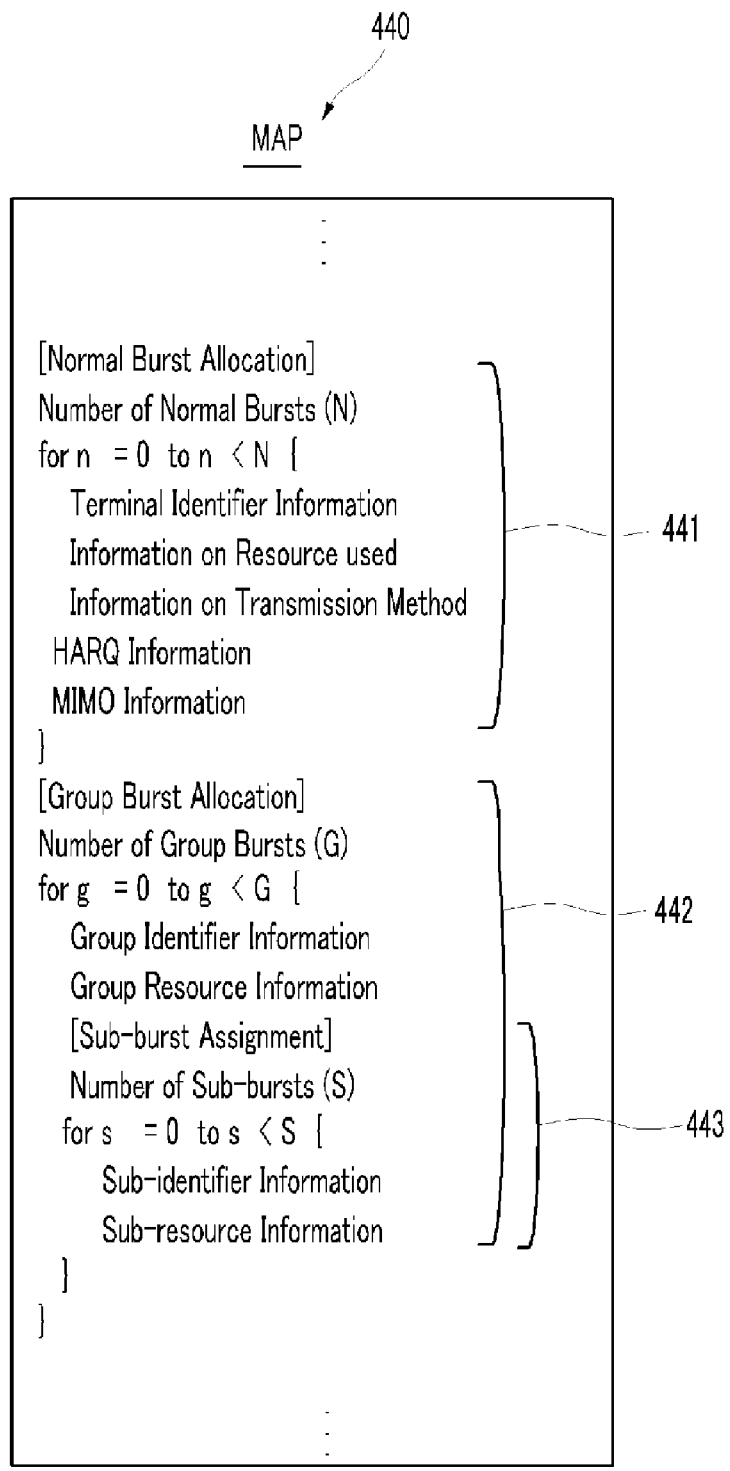

[Fig. 8]
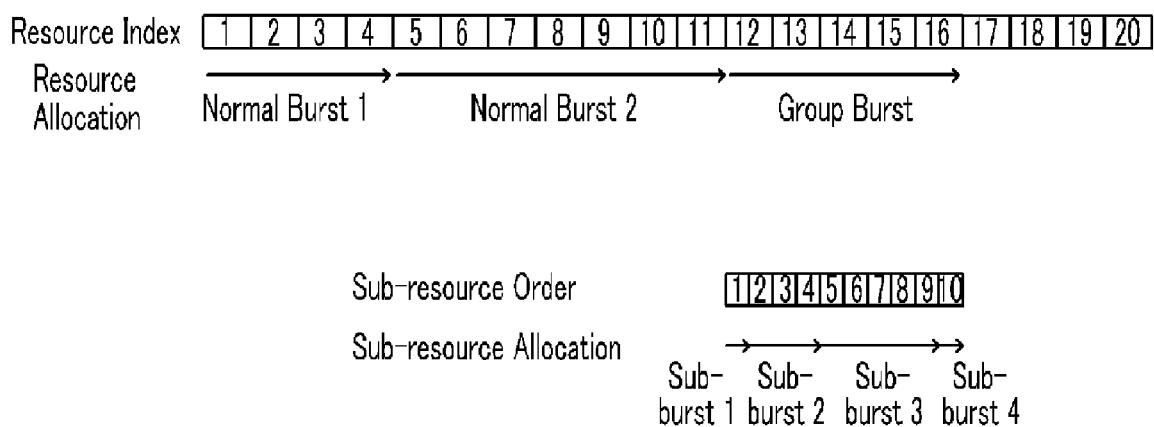

[Fig. 9]
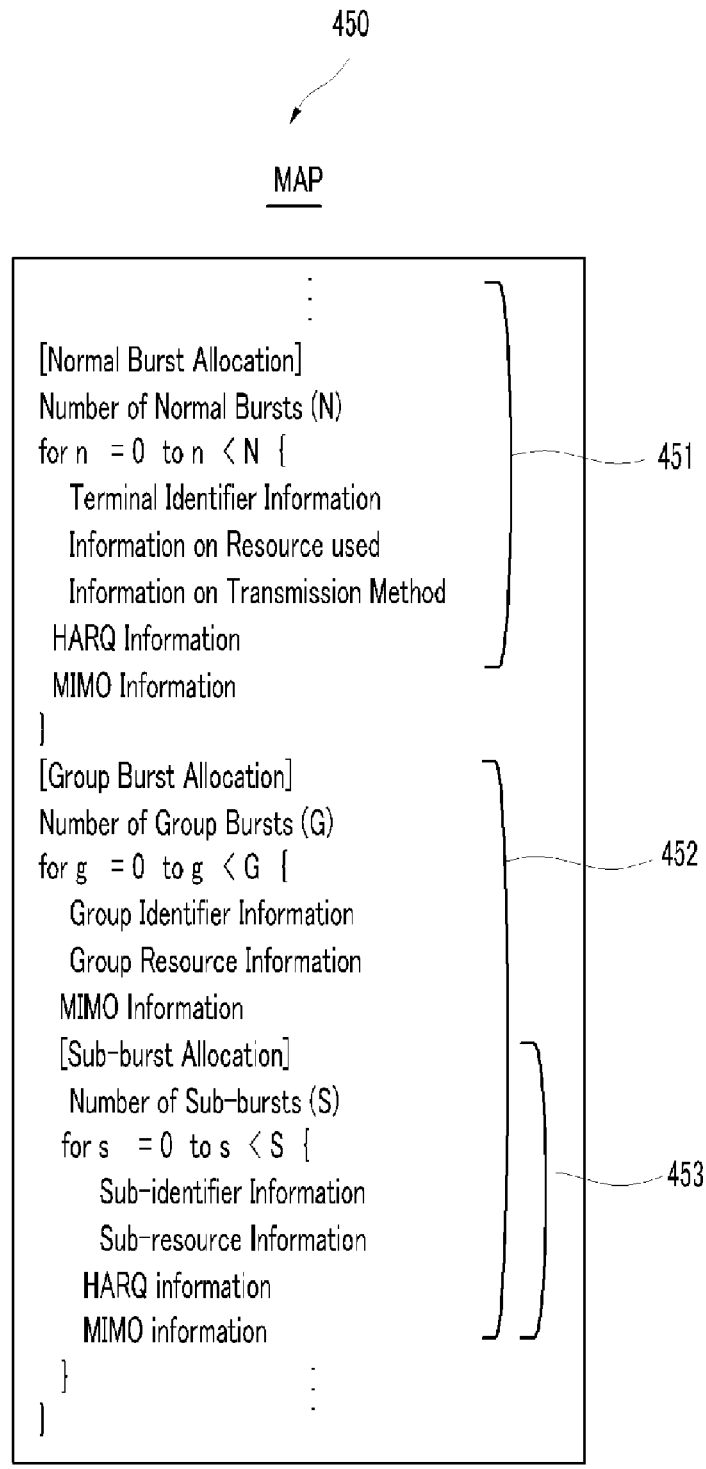

[Fig. 10]
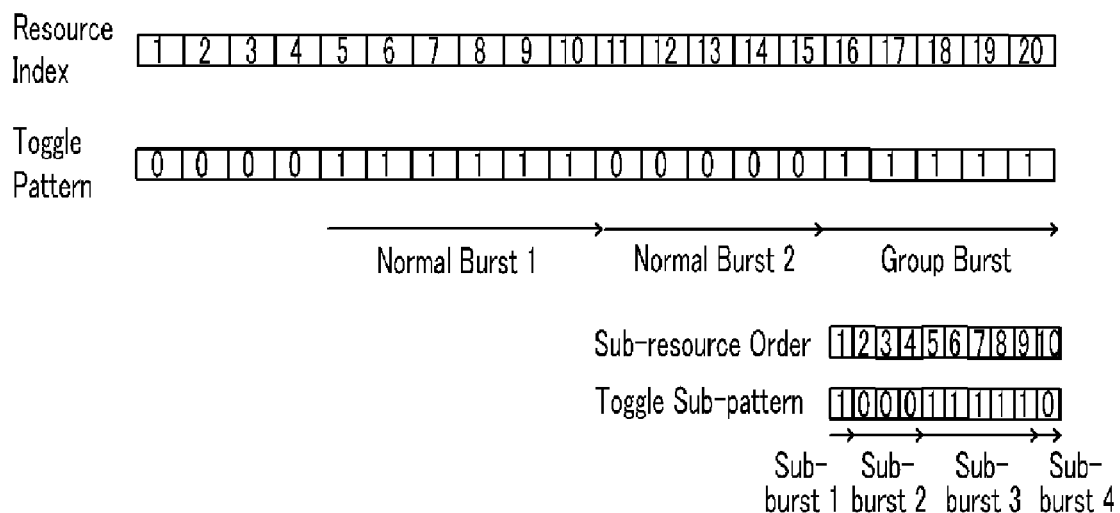

[Fig. 11]

Resource Index  | 1 | 2 | 3 | 4 | 5 | 6 | 7 | 8 | 9 | 10 | 11 | 12 | 13 | 14 | 15 | 16 | 17 | 18 | 19 | 20 |

Toggle Pattern  | 1 | 1 | 1 | 1 | 1 | 0 | 0 | 0 | 0 | 0 | 0 | 0 | 1 | 1 | 1 | 1 | 1 | 0 | 0 | 0 | 0 |

Normal Burst 1   Normal Burst 2    Group Burst

Sub-resource Order | 1 | 2 | 3 | 4 | 5 | 6 | 7 | 8 | 9 | 10 |
Toggle Sub-pattern | 1 | 0 | 0 | 0 | 1 | 1 | 1 | 1 | 1 | 0 |

Sub-burst 1  Sub-burst 2  Sub-burst 3  Sub-burst 4

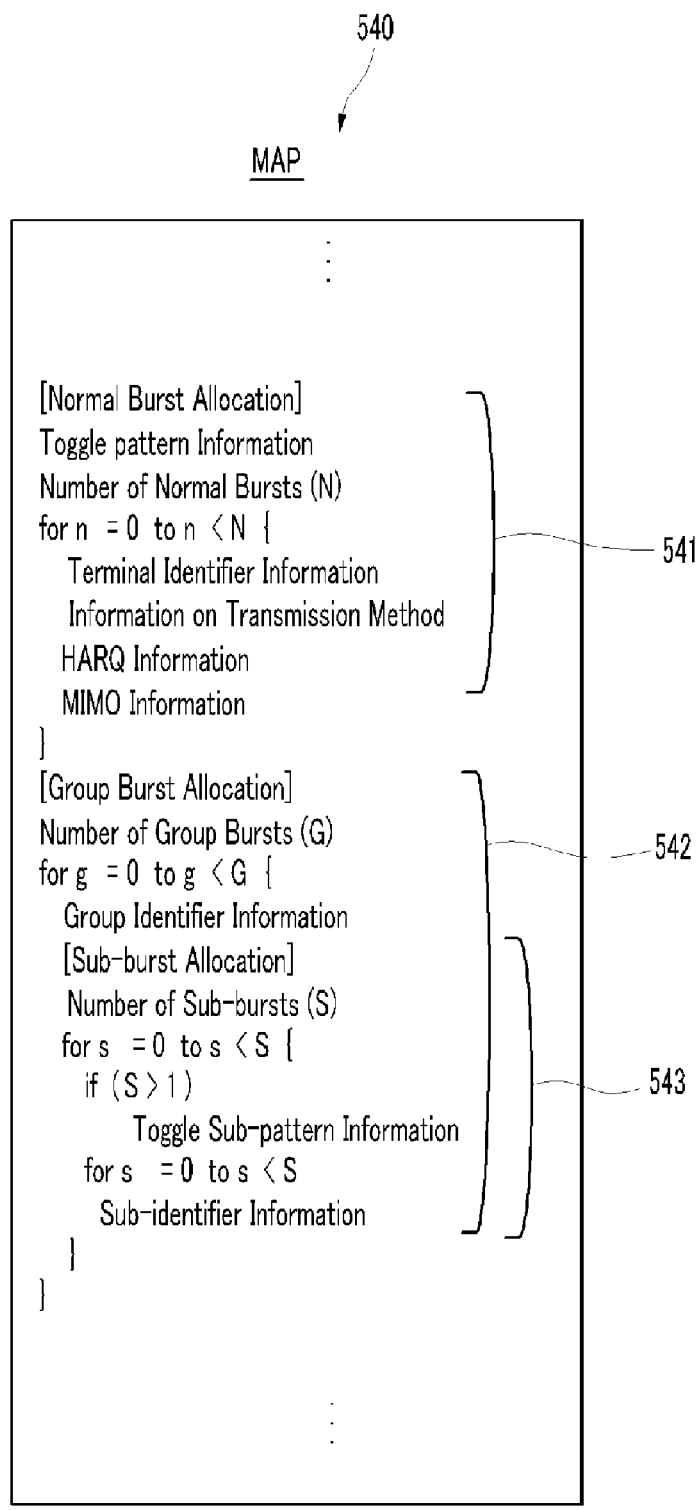

METHOD OF ALLOCATING TERMINAL TO GROUP IN BASE STATION OF COMMUNICATION SYSTEM AND METHOD OF GENERATING MAP

TECHNICAL FIELD

The present invention relates to an apparatus and method of allocating a plurality of terminals to a group in a base station of a communication system.

BACKGROUND ART

A communication system informs terminals of allocated radio resources by using a map transmitted in a downlink for every frame. The map is specified, for example, in an IEEE 802.16 standard.

When bursts are allocated in the downlink and the uplink, the communication system includes a terminal identifier, a transmission method, and a resource used, which correspond to each of the bursts, so as to notify the terminals of the downlink or uplink radio resources.

Further, a plurality of packets that are transmitted from a base station to a plurality of terminals may be allocated as one burst. In this case, a plurality of terminal identifiers corresponding to the packets are omitted. Each of the terminals demodulates the corresponding burst, checks the identifier included in each of the packets, and selectively receives only the packet corresponding to the terminal.

According to the above-described burst allocation, since all of the terminals need to receive the burst, each of the terminals needs to perform a process of receiving the burst even if there is no packet corresponding to the terminal.

Further, in a case of the uplink, it is necessary to provide exact positions of the radio resources to be transmitted by the terminals such that the bursts can be transmitted by the terminals without collision therebetween. Therefore, the burst allocation cannot be applied to the uplink.

Furthermore, when a hybrid automatic repeat request (referred to as an "HARQ" is applied, each terminal may successfully receive a group burst or fail to receive the group burst. Therefore, the burst needs to be retransmitted a maximum number of times or until all of the terminals succeed in receiving the burst.

Further, when multi-input multi-output (hereinafter, referred to as "MIMO" is applied, all of the terminals have different channel states, which makes it difficult to efficiently apply a closed-loop MIMO method.

The above information disclosed in this Background section is only for enhancement of understanding of the background of the invention and therefore it may contain information that does not form the related art that is already known in this country to a person of ordinary skill in the art.

DISCLOSURE OF INVENTION

Technical Problem

An object of the present invention is to provide a group allocation method of allocating terminals to a group such that the terminals can receive corresponding bursts.

Another object of the present invention is to provide a group allocation method that can also be applied to an uplink.

Still another object of the present invention is to provide a group allocation method that allows an HARQ or MIMO method to be applied according to terminals.

Technical Solution

An exemplary embodiment of the present invention provides a method of allocating a terminal to one of a plurality of groups in a base station of a communication system, and each group includes a plurality of terminals. The method includes: receiving channel state information on the terminal; determining a group to which the terminal belongs according to the channel state information; and transmitting a map including first allocation information on the group to the terminal. The first allocation information includes an identifier of the group and radio resource information of a group burst on the group.

Another exemplary embodiment of the present invention provides a method of dividing a plurality of terminals into a plurality of groups and generating a map for transmitting allocation information on the plurality of groups in a base station of a communication system. The method includes: allocating identifiers of the plurality of groups to the map; and allocating radio resource information on a plurality of group bursts respectively corresponding to the plurality of groups to the map.

Yet another embodiment of the present invention provides a method of allocating a plurality of terminals to a plurality of groups in a base station of a communication system. The method includes: receiving channel state information from a plurality of first terminals; allocating a plurality of second terminals to the same group, the plurality of second terminals are terminals to which the same transmission method can be applied among the plurality of first terminals according to the channel state information; transmitting, to the plurality of second terminals, an identifier of the group to which the plurality of second terminals belong; and transmitting the identifier of the group and radio resource information of a group burst on the group to the plurality of second terminals.

BRIEF DESCRIPTION OF THE DRAWINGS

FIG. 1 is a schematic diagram illustrating the configuration of a communication system according to an exemplary embodiment of the present invention.

FIG. 2 is a block diagram illustrating a group allocation apparatus according to an exemplary embodiment of the present invention.

FIG. 3 is a flowchart illustrating a group allocation method in a downlink according to a first exemplary embodiment of the present invention.

FIGS. 4 and 5 are schematic views illustrating a frame and a map for group allocation in a downlink according to a second exemplary embodiment of the present invention.

FIGS. 6 and 7 are schematic views illustrating a frame and a map for group allocation according to a third exemplary embodiment of the present invention.

FIG. 8 is a view illustrating a method of notifying the positions of radio resources allocated according to the third exemplary embodiment of the present invention.

FIG. 9 is a schematic view illustrating a map for group allocation according to a fourth exemplary embodiment of the present invention.

FIGS. 10 and 11 are views illustrating a method of notifying the positions of radio resources allocated according to a fifth exemplary embodiment of the present invention.

FIG. 12 is a view illustrating a map for group allocation according to the fifth exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, an apparatus and method of allocating a plurality of terminals to a group in a base station of a communication system according to exemplary embodiments of the present invention will be described in detail with reference to the accompanying drawings. The method of allocating a plurality of terminals to a group in a base station of a communication system according to the exemplary embodiment of the present invention can be used in various communication systems. Here, for convenience, an IEEE (Institute of Electrical and Electronics Engineers) 802.16-based communication system will be exemplified.

First, referring to FIGS. 1 to 3, a group allocation method and apparatus of a communication system according to a first exemplary embodiment of the present invention will be schematically described.

FIG. 1 is a schematic view illustrating a communication system according to the first exemplary embodiment of the present invention.

As shown in FIG. 1, the communication system includes one or more terminal groups 110 and 120, and a base station 200. The terminal groups 110 and 120 include a plurality of terminals 111 to 114 and 121 to 124, respectively. For convenience of explanation, in FIG. 1, there are provided two terminal groups, and each of the terminal groups includes four terminals. However, the number of terminal groups and the number of terminals included in each of the terminal groups are not limited thereto.

The base station 200 classifies the terminals 111 to 114 and 121 to 124 having the same or similar characteristics into the terminal groups 110 and 120, respectively. According to the exemplary embodiment of the invention, the base station 200 can classify a plurality of terminals that require the same transmission method, that is, the same modulation and coding scheme, into one terminal group.

FIG. 2 is a block diagram illustrating a group allocation apparatus according to the first exemplary embodiment of the present invention, and FIG. 3 is a flowchart illustrating a group allocation method in a downlink using the group allocation apparatus of FIG. 1.

As shown in FIG. 2, the group allocation apparatus of the base station 200 includes a receiving unit 210, a group allocation unit 220, and a transmitting unit 230.

Referring to FIGS. 2 and 3, the receiving unit 210 receives information on a channel state of each of the terminals from the terminal (for example, the terminal 111 of FIG. 1) (S210). The group allocation unit 220 determines which group 110 the terminal 111 belongs to on the basis of the received channel state information (S220), and selects an appropriate transmission method for the group 110 according to channel states of the terminals 111 to 114 that belong to the group 110 (S230). Then, the transmitting unit 230 transmits an identifier corresponding to the group to which the terminal 111 is allocated to the corresponding terminal by using a separate message or a MAP (S240). At this time, the identifier corresponding to the group may be an identifier of the corresponding group or sub-identifiers used when differentiating the terminals in the corresponding group from each other.

Here, the group identifier refers to an identifier used when differentiating the groups from each other, and it can be set so that each one of the group identifiers corresponds to one transmission method. Further, the base station 200 can inform each of the terminals 111 to 114 and 121 to 124 of the relationship between the transmission methods and the group identifiers.

Furthermore, the group to which the terminals belong may be changed according to a change in the channel state. When the channel state quickly changes, and the transmission method and the group corresponding to the changed channel state frequently change, signaling for determining a group is often required. Therefore, the group allocation method may only be used for the terminals whose transmission methods are not changed a lot.

Next, after the terminals are allocated to the groups, a method of notifying the allocation of a group burst of the terminals and a group allocation method will be described in detail with reference to FIGS. 4 to 12.

FIGS. 4 and 5 are schematic views illustrating a map and a frame for group allocation in a downlink according to a second exemplary embodiment of the present invention.

As shown in FIG. 4, a downlink frame 300 according to the second exemplary embodiment of the present invention includes one or more normal bursts 310 and 320 and at least one group burst 330. Packets 331 to 334 to be transmitted as a group are allocated to the group burst 330.

Further, as shown in FIG. 5, a map 340 transmitted from the base station 200 to the terminal 111 includes information 341 on the allocation of the normal bursts 310 and 320 and information 342 on the allocation of the group burst 330 so as to notify the allocation of the normal bursts and the group burst. The information 341 on the normal burst allocation includes the number N of normal bursts, terminal identifier information on each of the normal bursts, information on radio resources to be used, information on a transmission method, HARQ information, and MIMO information.

Meanwhile, the information 342 on the group burst allocation includes the number G of group bursts, group identifier information on each of the group bursts, and information on radio resources to be used.

In this way, each of the terminals can only receive a group burst of a group to which the terminal belongs by using the group identifier and the radio resource information.

FIGS. 6 and 7 are schematic views illustrating a frame and a map for group allocation according to a third exemplary embodiment of the present invention. FIG. 8 is a view illustrating a method of notifying the positions of radio resources allocated according to the third exemplary embodiment of the present invention.

As shown in FIG. 6, a downlink frame 400 according to the third exemplary embodiment of the present invention includes one or more normal bursts 410 and 420 and at least one group burst 430. The group burst 430 includes one or more sub-bursts 431 to 434.

Referring to FIG. 7, as compared with the map 340 (FIG. 5) according to the second exemplary embodiment, a map 440 transmitted from the base station 200 to the terminal 111 further includes sub-burst allocation information 443. That is, the map 440 includes information 441 on the allocation of the normal bursts 410 and 420 and information 442 on the allocation of the group burst 430. The information 442 on the group burst allocation further includes the information 443 on the sub-burst allocation.

The information 443 on the sub-burst allocation includes information on the number S of sub-bursts, sub-identifier information on each of the sub-bursts, and information on a sub-radio resource.

At this time, the sub-radio resources are in the radio resources allocated for the group burst. The number of bits used to notify the positions of the sub-radio resources may be smaller than the number of bits that are generally used to notify the position of the radio resource. The method of notifying the positions of the sub-radio resources will be described with reference to FIG. 8.

As shown in FIG. 8, according to the third exemplary embodiment of the present invention, the positions of the radio resources are determined by a start-length method or a run-length method. Specifically, the radio resource is divided into a plurality of unit radio resources, and an index is added to each of the unit radio resources. The radio resource information of each of the bursts includes the start position and length of the radio resource. For example, the radio resource information of the normal burst 2 may include the start position 5 and the length 7 of the radio resource, and the sub-radio resource information of the sub-burst 2 may include the start position 2 and the length 4 of the radio resource.

To this end, a $\log_2(R)$ bit is required for each of the length and the start position of the radio resource. That is, a $2\log_2(R)$ bit is required when one burst is allocated. Here, R indicates the number of unit radio resources to be used in a frame. Meanwhile, in order to allocate sub-bursts, the positions of the sub-bursts need to be differentiated from each other within the resource allocated for the group burst. When the maximum number of radio resources is R/8, sub-radio resource information can be represented by a $2\log_2(R/8)$ bit that is smaller than the normal burst.

Further, as shown in FIG. 8, the size of the unit sub-radio resource may be smaller than that of the unit radio resource used for the normal burst and group burst allocation. In this case, the size of a sub-burst is not limited to the size of a unit radio resource, but it may be set to an integral number of the size of the unit sub-radio resource that is smaller than the unit radio resource. Therefore, the allocation of smaller packets can be expressed.

In the example shown in FIG. 8, since the size of the unit sub-radio resource is half of the unit radio resource, it may be shown that the size of the sub-burst is half of the normal burst.

In the third exemplary embodiment, when the base station 200 notifies the terminals 111 to 114 and 121 to 124 of the relationship between the transmission methods and the group identifiers through broadcasting channels in advance, the base station 200 also notifies sub-identifiers that are used when differentiating the terminals from each other in the group.

In this way, it is possible to notify the position of the sub-burst that is transmitted by each of the terminals during group allocation in an uplink as well as the group allocation in a downlink.

FIG. 9 is a schematic view illustrating a map for group allocation according to a fourth exemplary embodiment of the present invention.

As shown in FIG. 9, unlike the third exemplary embodiment, in a map 450 according to the fourth exemplary embodiment, sub-burst allocation information 453 in group burst allocation information 452 further includes HARQ information and/or MIMO information on the sub-bursts. In this way, since the HARQ information and the MIMO information can be allocated according to the sub-bursts, each of the terminals can perform the HARQ transmission and the MIMO transmission.

Further, unlike the third and fourth exemplary embodiments, the base station uses a toggle pattern method instead of the start-length method or the run-length method to notify each of the terminals of the position of the radio resource. This exemplary embodiment will be described in detail with reference to FIG. 10 to FIG. 12.

FIGS. 10 and 11 are views illustrating a method of notifying the positions of radio resources allocated according to a fifth exemplary embodiment of the present invention. FIG. 12 is a diagram illustrating a map for group allocations according to the fifth exemplary embodiment of the present invention.

As shown in FIG. 10, the base station 200 uses a toggle pattern method to notify the positions of the radio resources allocated to the terminal 111. Specifically, the allocated radio resource is divided into a plurality of unit radio resources like the third exemplary embodiment of FIG. 8. Each of the unit radio resources is represented by 0 or 1 according to a toggle method, such that the position of the radio resource allocated to each of the terminals is informed.

When the toggle pattern starts from 0, the length of a pattern sequence corresponds to the number of radio resources to be used. First consecutive 0s indicate radio resources that are not used. The radio resources are toggled from the first consecutive 0s to consecutive 1s, which indicate the radio resources for the normal burst 1. Then, the radio resources are toggled again from the consecutive 1s to consecutive 0s, which indicate the radio resources for the normal burst 2. Finally, the radio resources are toggled from the consecutive 0s to consecutive 1s, which are used for the group burst allocation.

A toggle sub-pattern is used to notify the positions of the radio resources of sub-bursts (sub-bursts 1 to 4) in the group burst. The length of the toggle sub-pattern is determined according to the number of radio resources allocated to the group burst. For example, when the size of the radio resources for the group burst is 5 and the radio resource includes two sub-radio resources, the length of the toggle sub-pattern is 5*2=10.

The sub-radio resources for the respective sub-bursts are determined according to the order in which the sub-radio resources are represented by toggles of 0 and 1 in the toggle sub-pattern of the map.

Further, as shown in FIG. 11, when the toggle pattern starts from 1, the radio resources of the normal burst 1 are represented by consecutive 1s, and the radio resources of the normal burst 2 are represented by consecutive 0s to which the radio resources of the normal burst 1 are toggled from the consecutive 1s. The radio resources of the group burst are represented by consecutive 1s to which the radio resources of the normal burst 2 are toggled from the consecutive 0s. Finally, consecutive 0s to which the radio resources of the group burst are toggled from the consecutive 1s are not used.

In this way, it is possible to simultaneously notify the positions of the resources as one pattern sequence with respect to the plurality of bursts.

As shown in FIG. 12, a map according to the fifth exemplary embodiment, which is used for the base station 200 to notify the terminal 111 of the group allocation by using the toggle pattern method, includes information 541 on normal burst allocation, information 542 on group burst allocation, and information 543 on sub-burst allocation. The information 541 on the normal burst allocation includes toggle pattern information that expresses allocated resources using consecutive 0s and 1s, the number N of normal bursts, terminal identifiers corresponding to the respective normal bursts, information on transmission methods, HARQ information, and MIMO information. The information 542 on the group burst allocation includes the number G of group bursts, and group identifiers corresponding to the respective group bursts. The information 543 on the sub-bursts included in the group burst includes toggle sub-pattern information, the number S of sub-bursts, and sub-identifiers corresponding to the respective sub-bursts.

In this way, the radio resources are allocated using the toggle pattern, such that it is possible to notify the positions of the resources of the respective terminals at the same time by using one pattern sequence with respect to the plurality of bursts.

Here, like the fourth exemplary embodiment shown in FIG. 9, the sub-burst allocation information in the group burst allocation information may further include HARQ information and/or MIMO information on the sub-bursts. In this way, the HARQ information and the MIMO information can be allocated according to the sub-bursts even in the group allocation using the toggle pattern method. Therefore, it is possible to perform the HARQ transmission and the MIMO transmission according to each of the terminals.

According to the exemplary embodiments of the present invention, it is possible to reduce the number of bits required for the radio resource allocation signaling for a plurality of small packets by the group allocation, and the multi-input multi-output and the hybrid automatic repeat request can be made in the uplink.

The above-described exemplary embodiments of the present invention are not limited to the above-described method and apparatus. The invention may be implemented by a program causing to implement functions corresponding to the structure of the exemplary embodiment of the present invention or a recording medium storing the program and may be easily implemented on the basis of the above-described exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of allocating a terminal to one of a plurality of groups in a base station of a communication system, each group including a plurality of terminals, the method comprising:
receiving channel state information on the terminal;
determining a group to which the terminal belongs according to the channel state information; and
transmitting a map including first allocation information on the group to the terminal,
wherein the first allocation information includes an identifier of the group and radio resource information of a group burst on the group,
wherein the radio resource information of the group burst includes a toggle pattern on a plurality of radio resources to which the group burst is allocated, and
wherein the toggle pattern includes consecutive 0s or consecutive 1s, and a length of a sequence of the toggle pattern corresponds to the plurality of the radio resources to which the group burst is allocated.

2. The method of claim 1, wherein a plurality of terminals that belong to the same group uses the same transmission method.

3. The method of claim 1, wherein the first allocation information includes a number of group bursts.

4. The method of claim 1, further comprising transmitting the identifier of the group to the terminal before transmitting the map including the first allocation information.

5. The method of claim 1,
wherein the group burst includes a plurality of sub-bursts,
the first allocation information further includes second allocation information on the sub-bursts, and
the second allocation information includes a sub-identifier of each of the sub-bursts and sub-radio resource information of each of the sub-bursts.

6. The method of claim 5, wherein the sub-radio resource information of each of the sub-bursts includes a length and a start position of the sub-radio resource to which the sub-burst is allocated.

7. The method of claim 5, wherein the radio resource information of each of the sub-bursts includes a toggle pattern on the radio resource to which each of the sub-bursts is allocated.

8. The method of claim 5,
wherein the radio resource to which the group burst is allocated includes at least one unit radio resource, and
the sub-radio resource to which each of the sub-bursts is allocated includes at least one unit sub-radio resources, and
the unit radio resource is divided into a plurality of unit sub-radio resources.

9. The method of claim 5, wherein the second allocation information further includes at least one of multi-input multi-output information of each of the sub-bursts and hybrid automatic repeat request information of each of the sub-bursts.

10. A method of dividing a plurality of terminals into a plurality of groups and generating a map for transmitting allocation information on the plurality of groups in a base station of a communication system, the method comprising:
allocating identifiers of the plurality of groups to the map; and
allocating radio resource information on a plurality of group bursts respectively corresponding to the plurality of groups to the map,
wherein the radio resource information of the group burst includes a toggle pattern on a plurality of radio resources to which the group burst is allocated, and
wherein the toggle pattern includes consecutive 0s or consecutive 1s, and a length of a sequence of the toggle pattern corresponds to the plurality of the radio resources to which the group burst is allocated.

11. The method of claim 10, further comprising: allocating the number of group bursts to the map; and allocating the identifiers of the groups to the map.

12. The method of claim 10, further comprising allocating sub-radio resource information on a plurality of sub-bursts to the map, the plurality of sub-bursts respectively corresponding to a plurality of terminals included in at least one of the plurality of groups.

13. The method of claim 12, further comprising:
allocating the number of sub-bursts to the map; and
allocating identifiers of the plurality of sub-bursts to the map.

14. A method of allocating a plurality of terminals to a plurality of groups in a base station of a communication system, the method comprising:
receiving channel state information from a plurality of first terminals;
allocating a plurality of second terminals to the same group, the plurality of second terminals are terminals to which the same transmission method can be applied among the plurality of first terminals according to the channel state information;

transmitting, to the plurality of second terminals, an identifier of the group to which the plurality of second terminals belong; and transmitting the identifier of the group and radio resource information of a group burst on the group to the plurality of second terminals, wherein the radio resource information of the group burst includes a toggle pattern on a plurality of radio resources to which the group burst is allocated, and wherein the toggle pattern includes consecutive 0s or consecutive 1s, and a length of a sequence of the toggle pattern corresponds to the plurality of the radio resources to which the group burst is allocated.

* * * * *